United States Patent
Hsia et al.

(10) Patent No.: US 9,169,133 B2
(45) Date of Patent: Oct. 27, 2015

(54) WATER VAPOR COLLECTORS

(71) Applicants: Chih-Yu Hsia, Arcadia, CA (US); Michael Jonathan Hsia, Arcadia, CA (US); Patricia Shirley Hsia, Arcadia, CA (US)

(72) Inventors: Chih-Yu Hsia, Arcadia, CA (US); Michael Jonathan Hsia, Arcadia, CA (US); Patricia Shirley Hsia, Arcadia, CA (US)

(*) Notice: Subject to any disclaimer, the term of this patent is extended or adjusted under 35 U.S.C. 154(b) by 294 days.

(21) Appl. No.: 13/775,196

(22) Filed: Feb. 24, 2013

(65) Prior Publication Data

US 2014/0238838 A1    Aug. 28, 2014

(51) Int. Cl.
*C02F 1/14* (2006.01)
*C02F 103/08* (2006.01)

(52) U.S. Cl.
CPC ............... *C02F 1/14* (2013.01); *C02F 2103/08* (2013.01)

(58) Field of Classification Search
CPC ...... C02F 1/14; B01D 1/0005; B01D 1/0035; B01D 5/009; B01D 5/0018
USPC ......... 202/83, 185.1, 189, 190, 234; 159/903, 159/904
See application file for complete search history.

(56) References Cited

U.S. PATENT DOCUMENTS 2,412,466 A * 12/1946 Miller, Jr. ............... 202/234
4,219,387 A *  8/1980 Gruntman ............... 202/234
7,654,103 B2 *  2/2010 Hsia ...................... 202/234

* cited by examiner

*Primary Examiner* — Jill Warden
*Assistant Examiner* — Joye L Woodard

(57) ABSTRACT

A water vapor collector assembly consists of a transparent cover and a box which will float on a water surface. The transparent cover allows sun rays to evaporate some water in the box which confines and collect the vapor condensates. The condensates will be conveyed away by a tube under the box. A water wave operated shaker, a wind operated knocker, inserts to increase the water condensation surfaces, and various kinds of the box are also introduced.

2 Claims, 20 Drawing Sheets

WATER VAPOR COLLECTORS

CROSS-REFERENCE TO RELATED APPLICATIONS

Not Applicable.

BACKGROUND OF THE INVENTION

This invention relates to means to collect water vapors evaporated from a water surface.

Prior patent to Hsia (U.S. Pat. No. 7,654,103 B2) presented a freshwater collection system which comprises of a vapor collector field formed by vapor collectors which have floatable platforms with central holes and curved transparent roofs to collect water vapors which are evaporated by sun rays through the central holes then condensed on the interior surfaces of the transparent roofs by sprinkled waters which are supplied by pumps and sprinkler heads.

BRIEF SUMMARY OF THE INVENTION

To obtain freshwater from seawater or the like can be done by reverse osmosis or evaporation/condensation processes. However, these processes take much energy and equipment and they produce costly freshwater. The uses of sun rays were also attempted to obtain freshwater from sea water. Hsia (U.S. Pat. No. 7,654,103 B2) suggested to use sun rays to generate water vapors then to condense them by sprinkled waters. However, these processes are slow and relatively very inefficient. Therefore, means to produce relatively inexpensive freshwater from salt water have be sought.

The current invention will provide devices which will use the sun rays to generate water vapors. The invented devices then will use cool ambient water and other means to condense the water vapors to create freshwater. The created freshwater will then be collected and conveyed away by available means such as those suggested by Hsia (U.S. Pat. No. 7,654,103 B2).

These and other objects and advantages of the invention, as well as the details of illustrative embodiments, will be more fully understood from the following specification and drawings, in which:

BRIEF DESCRIPTIONS OF THE SEVERAL VIEWS OF THE DRAWING

FIG. 1 is an isometric view of the invented device. No hidden lines are shown. FIG. 1 also illustrates the uses of the invented device.

FIG. 2 is a cross-sectional view of the invented device shown in FIG. 1. No hidden lines are shown. FIG. 2 also illustrates the uses of the invented device.

FIG. 3 is an isometric view of the top box of the invented device. This device is viewed from above. The hidden lines are not shown.

FIG. 4 is an isometric view of the top box, a component of the invented device. This view is viewed from below. The hidden lines are not shown.

FIG. 5 is an isometric view of the weight and shaker, a component of the invented device.

FIG. 6 is an isometric view of a variation of the top box, a component of the invented device. This device is viewed from above. The hidden lines are not shown.

FIG. 7 is an isometric view of a variation of the top box, a component of the invented device. This device is viewed from below. The hidden lines are not shown.

FIG. 8 is an isometric view of another variation of the top box, a component of the invented device. This device is viewed from above. The hidden lines are not shown.

FIG. 9 is an isometric view of another variation of the top box, a component of the invented device. This device is viewed from below. The hidden lines are not shown.

Figure 15:
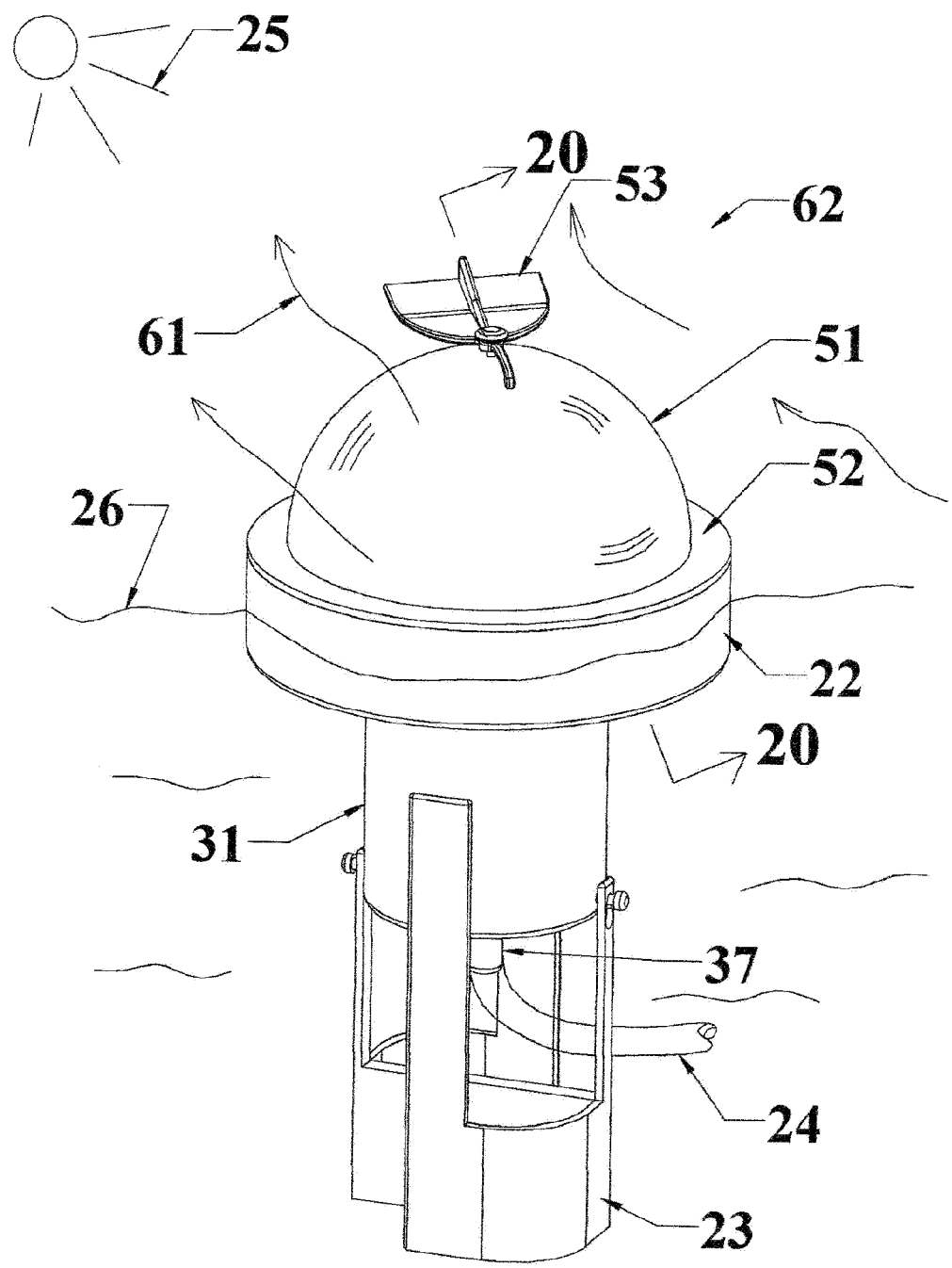

FIG. 15 is an isometric view of one variation of the invented device. No hidden lines are shown. FIG. 15 also illustrates the uses of the invented device.

Figure 16:
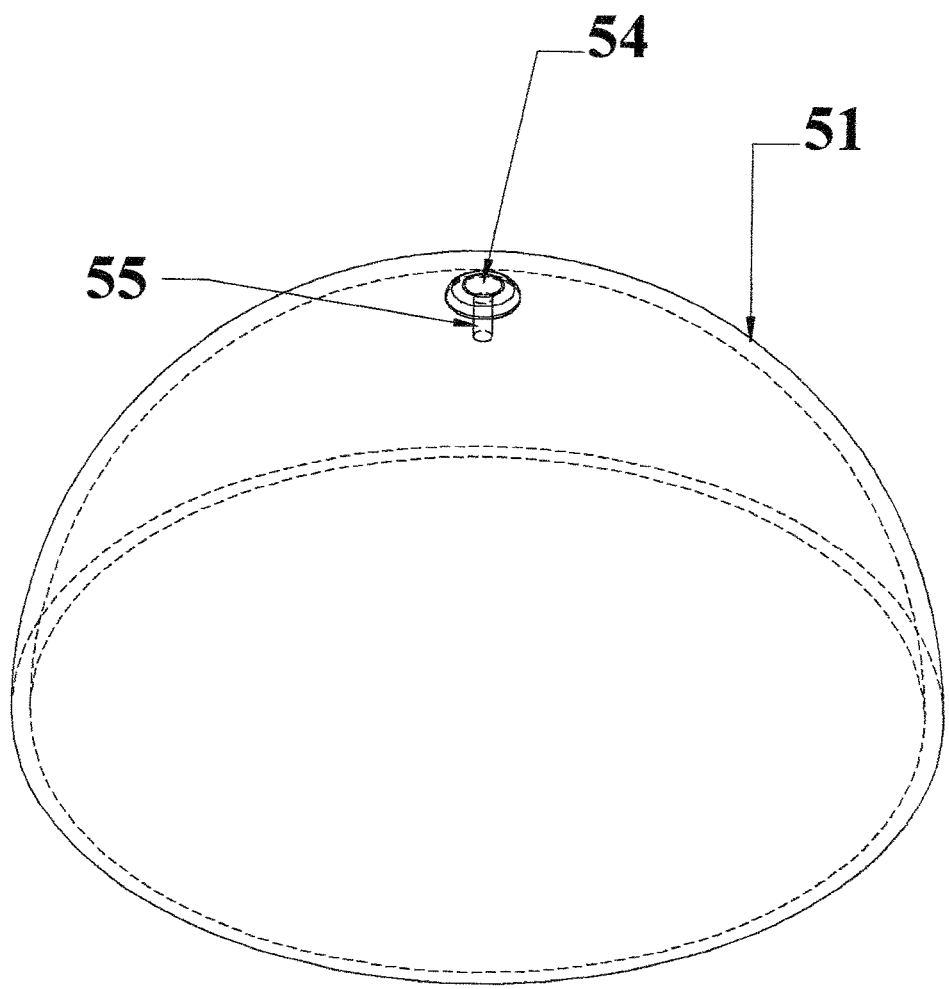

FIG. 16 is an isometric view of the dome of the invented device shown in FIG. 15.

Figure 17:
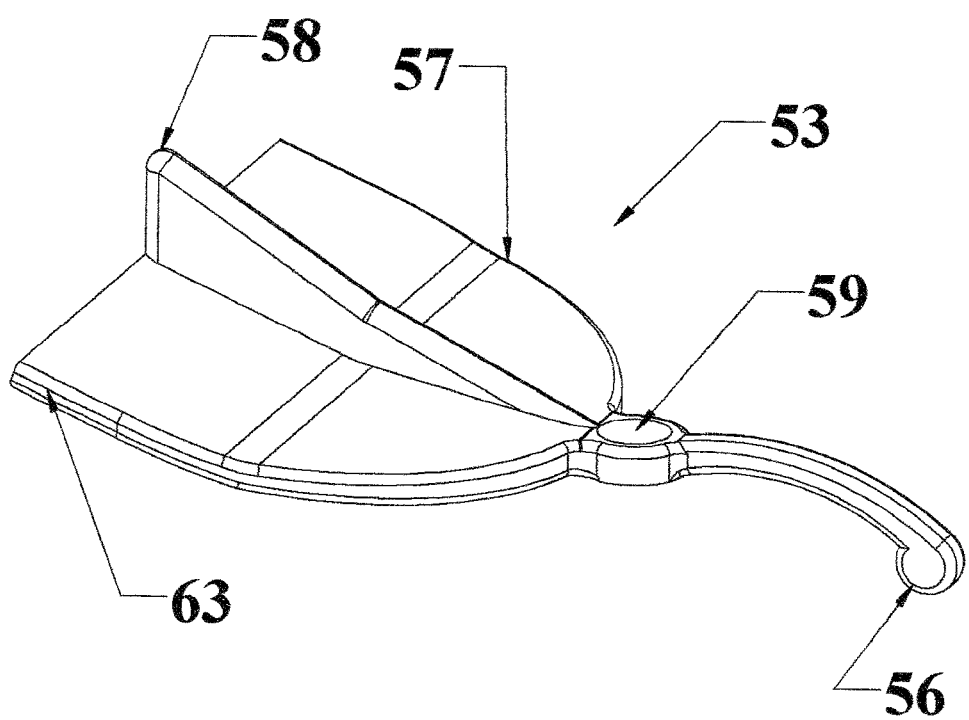

FIG. 17 is an isometric view of the knocker, a component of the invented device shown in FIG. 15. The hidden lines are not shown.

Figure 18:
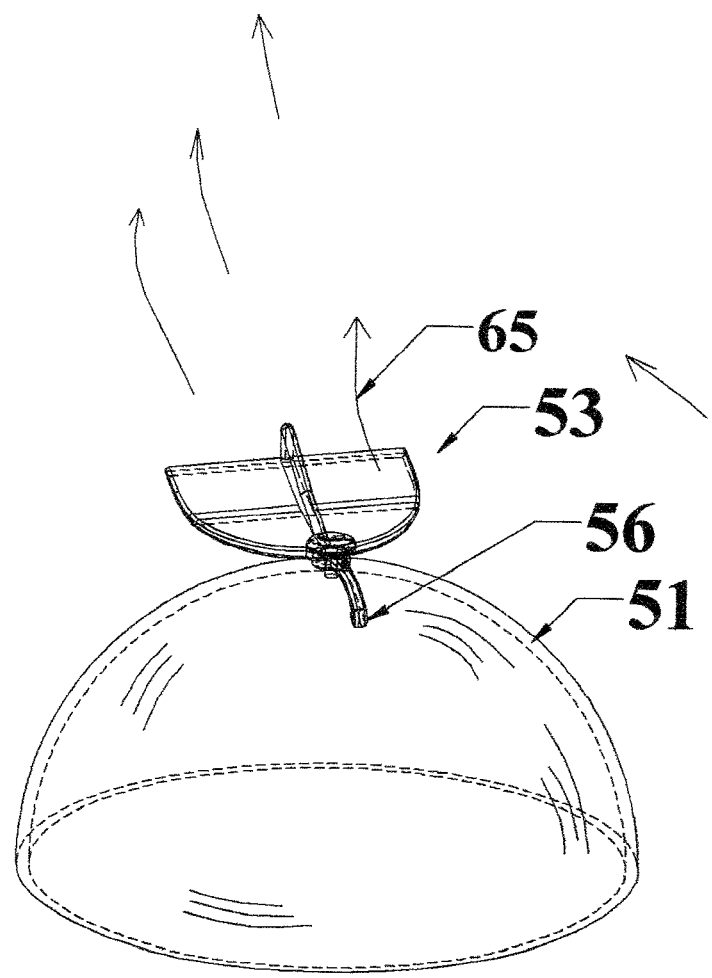

FIG. 18 is an isometric view of the dome and the knocker shown in FIG. 16 and FIG. 17. FIG. 18 is also used to illustrate the functions of these invented components.

Figure 19:
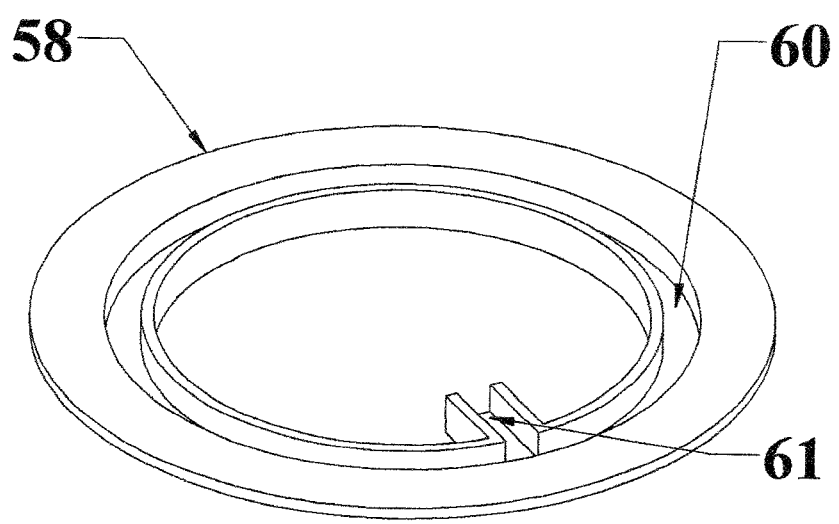

FIG. 19 is an isometric view of the dome water collector, a component of the invented device shown in FIG. 15.

Figure 20:
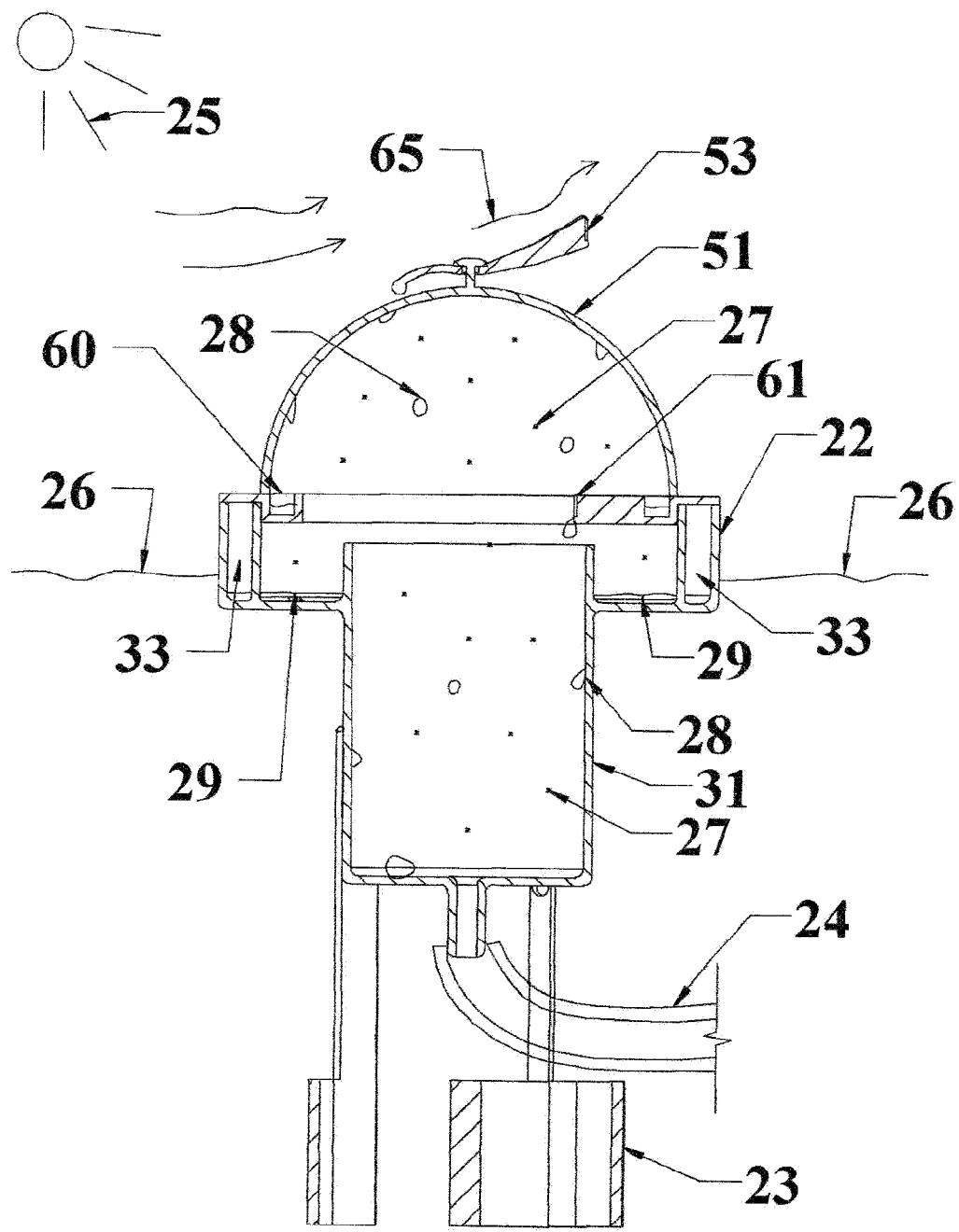

FIG. 20 is a cross-sectional view of the invented device shown in FIG. 15. No hidden lines are shown. FIG. 20 also illustrates the uses of the invented device.

DETAILED DESCRIPTION OF THE INVENTION

Referring to FIG. 1 through FIG. 5, the first variation of the invented water vapor collectors 1 consists of a transparent cover 21, a top box 22 and an optional weight/shaker 23. The transparent cover is made of a transparent material which allows sun ray to penetrate through. The top box consists of a condensate chamber 31 on the bottom and a float/vapor chamber 32 on the top. The condensate chamber is an open top container with an outlet 37 on the bottom and two optional weight/shaker mounts 36 which each has a shaft with enlarged head. The condensate chamber is made of a material which can transmit heat easily. The outlet can connect with a hose or a tube. The weight/shaker mount is an object extruding from the exterior wall of the condensate chamber. The float/vapor chamber has two chambers, the float chamber 33 and the vapor chamber 34. The float chamber has a floor and walls which can work with the transparent cover to enclose a space or spaces to provide floatation to the invented device. The vapor chamber has walls and a floor which has at least an opening, the water supply slot 35. The water supply slot will ensure that water can enter the vapor chamber when the invented device is in use. The tops of the walls, or the rim(s), of the vapor chamber will work with the transparent cover to enclose a space for water vapors. The rim of the condensate chamber is inside the vapor chamber and is above the floor of the vapor chamber but below the rim(s) of the vapor chamber so that water in the vapor chamber will not flow into the condensate chamber but water vapors can enter the condensate chamber. The weight/shaker 23 has a weight 38 which connects to two weight mounting arms 39 which each has a weight mounting hole 40. The weight also connects with at least one shaker arm 41 (two shaker arms are shown in the FIGs.). The weight/shaker will not float by itself in the water. The weight mounting hole has two connected semicircular holes; the lower hole being larger than the diameter of the enlarged head of the weight/shaker mount but the upper hole being smaller. The upper hole is larger than the diameter of the shaft of the weight/shaker mount. This will allow the weight/shaker to rotate freely on the weight/shaker mounts but will not disengage itself from the weight/shaker mounts. The weight/shaker can be mounted on the top box by the weight mounting holes engaging with the weight/shaker mounts as shown.

Figure 1:
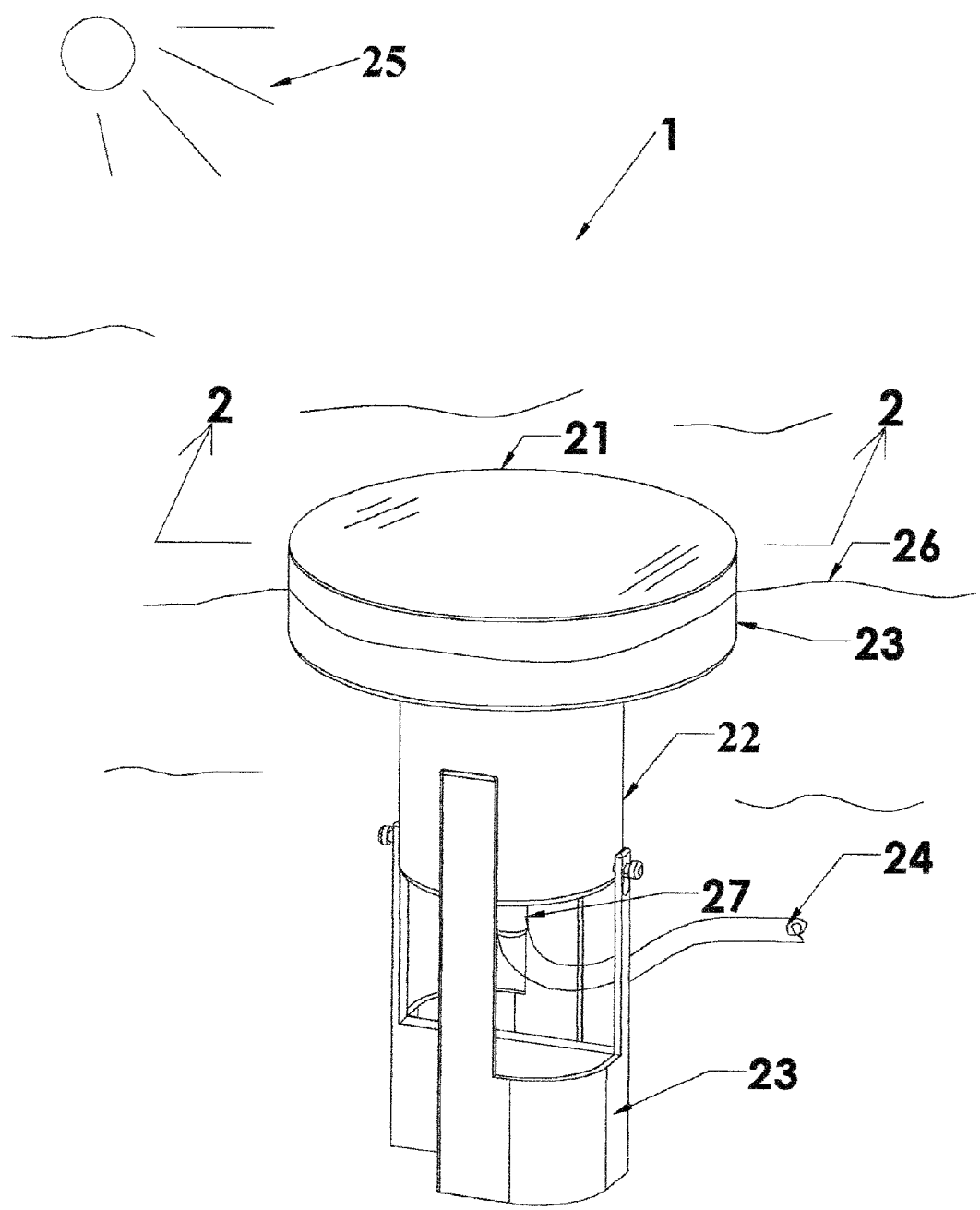
Figure 2:
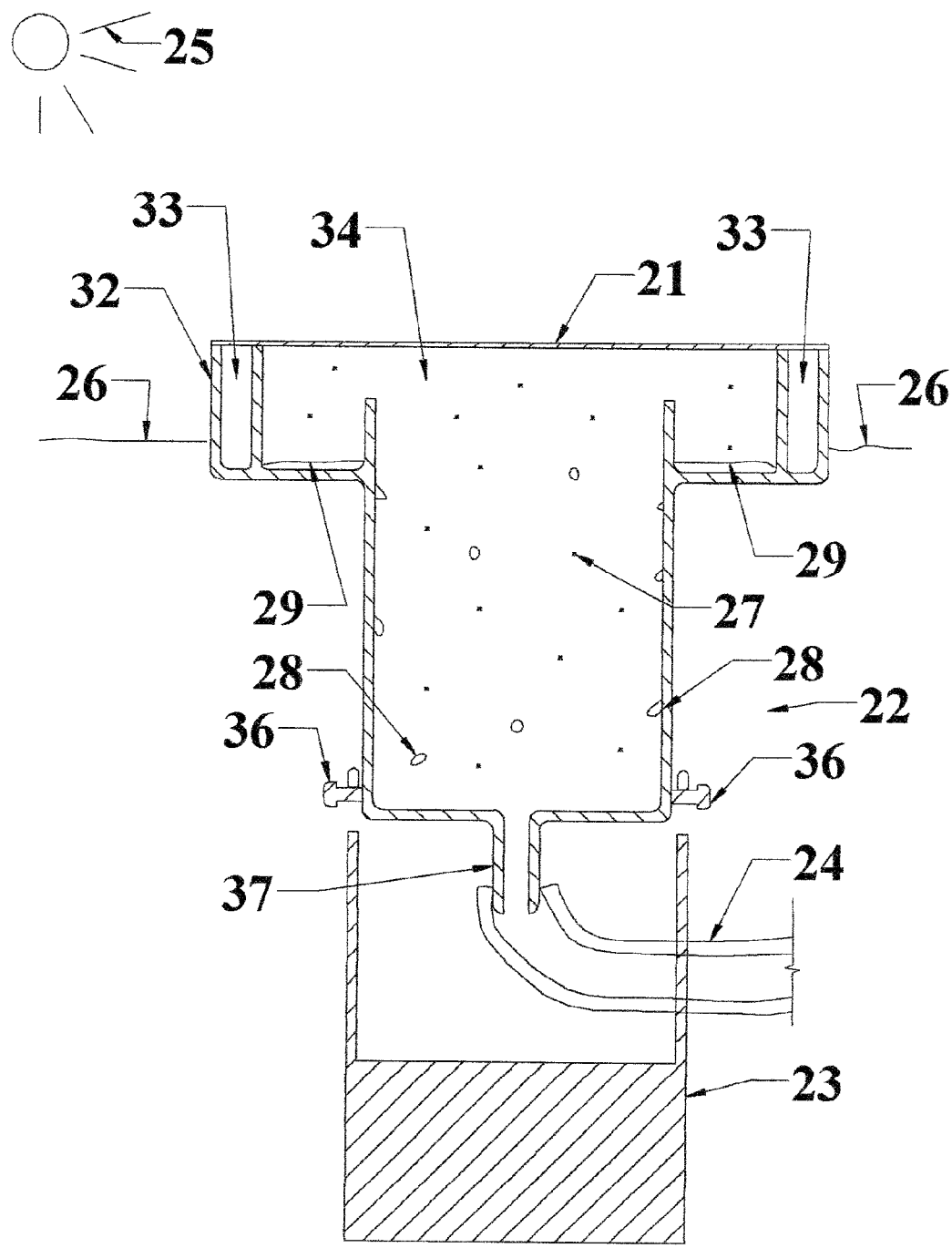
Figure 3:
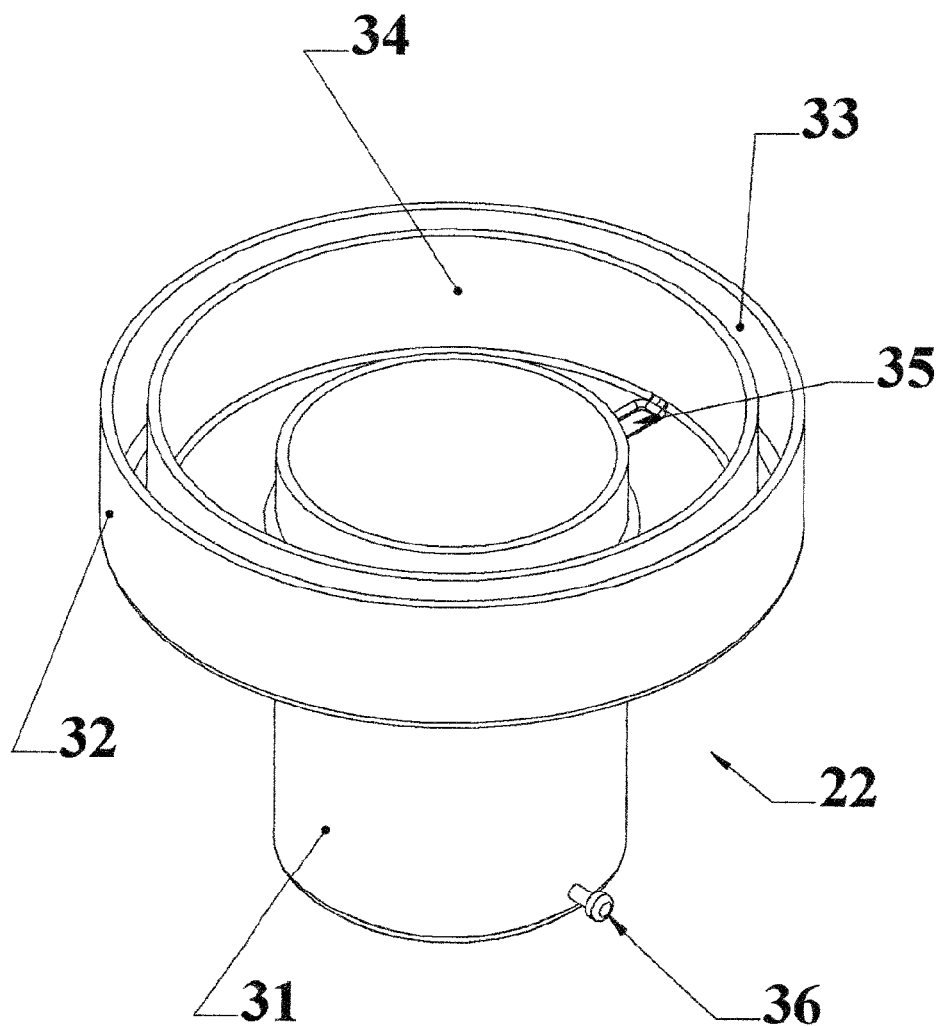
Figure 4:
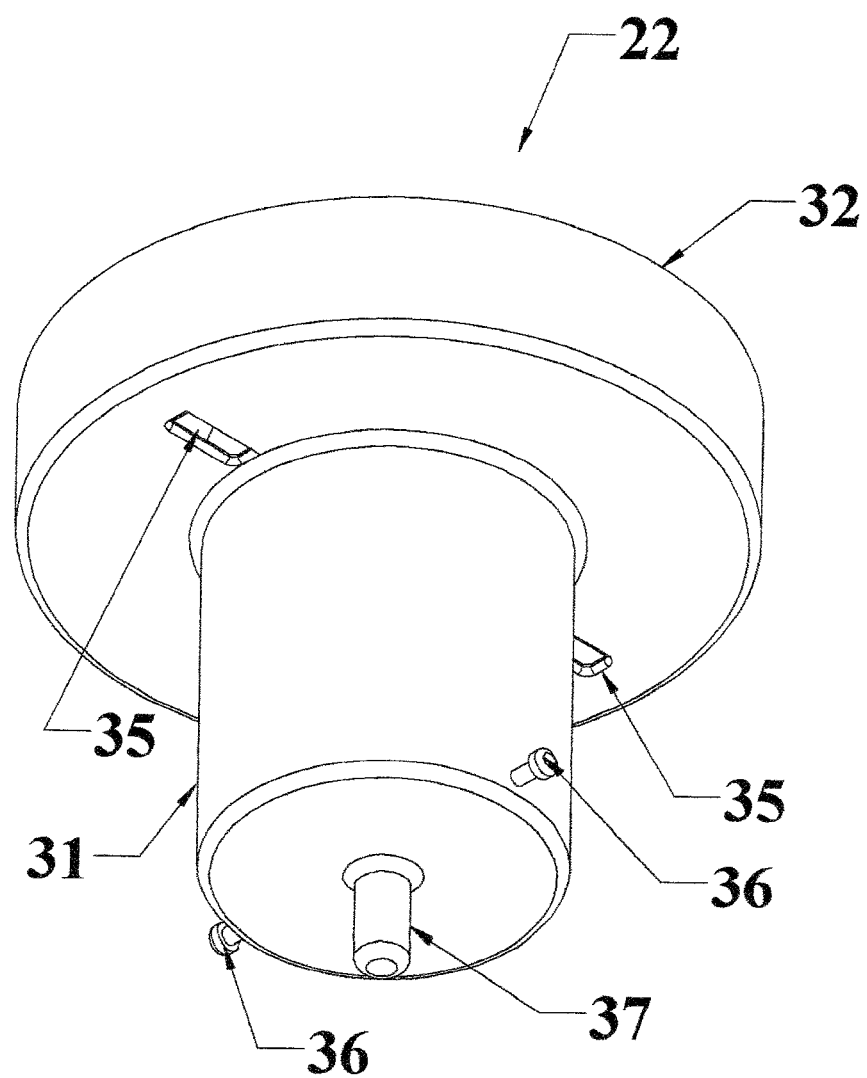
Figure 5:
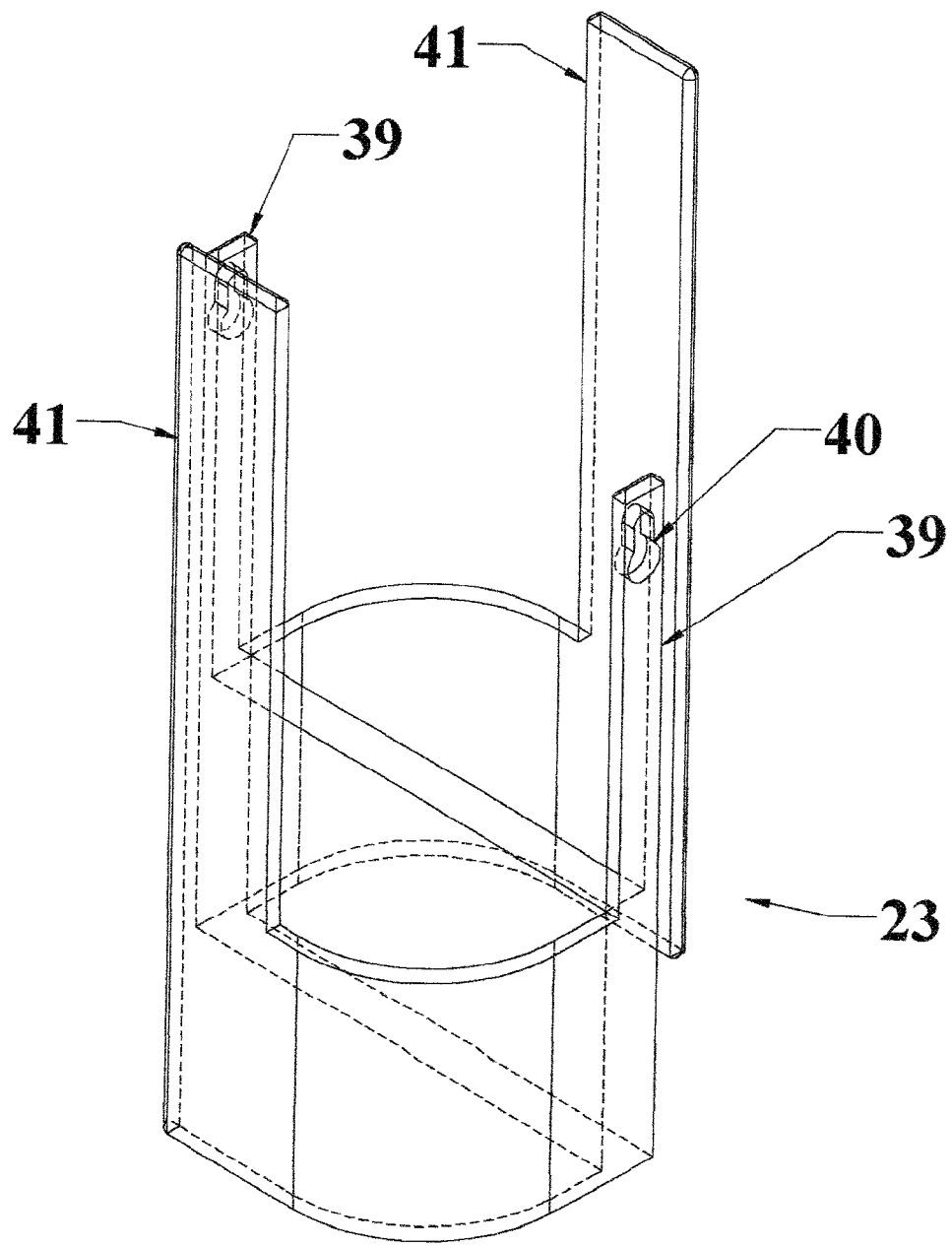

Referring to FIG. 1 and FIG. 2, when in use, a tube 24 will be connected to the outlet 37 then the invented device will be put on water. The device will float on water surface 26 and under the sun 25. Water 29 will enter the vapor chamber 34 through the water supply slot 35 (referring to FIG. 3). The sun rays will penetrate through the transparent cover and evaporate some of the water in the vapor chamber so water vapors 27 are generated. The water vapors will move freely and enter the open space of the condensate chamber through the gap between the rim of the condensate chamber and the bottom of the transparent cover. Due to the heat conductivity and the cool ambient water of the condensate chamber, water condensate 28 will appear on the interior surface of the condensate chamber. The water condensate will eventually drop to the bottom of the condensate chamber then flow through the outlet into the connected tube to be collected. The collection of water can be done by any convention means or by the means and methods suggested by Hsia (U.S. Pat. No. 7,654,103 B2). When the top box rocks with the water waves, the weight/shaker tends to stay relatively stationary in the water due to its weight. The differential movements/rotations will cause the top of the shaker arm to keep on knocking on the condensate chamber. These knockings can facilitate the downward movements of the water condensates to increase the freshwater generation rate.

Figure 6:
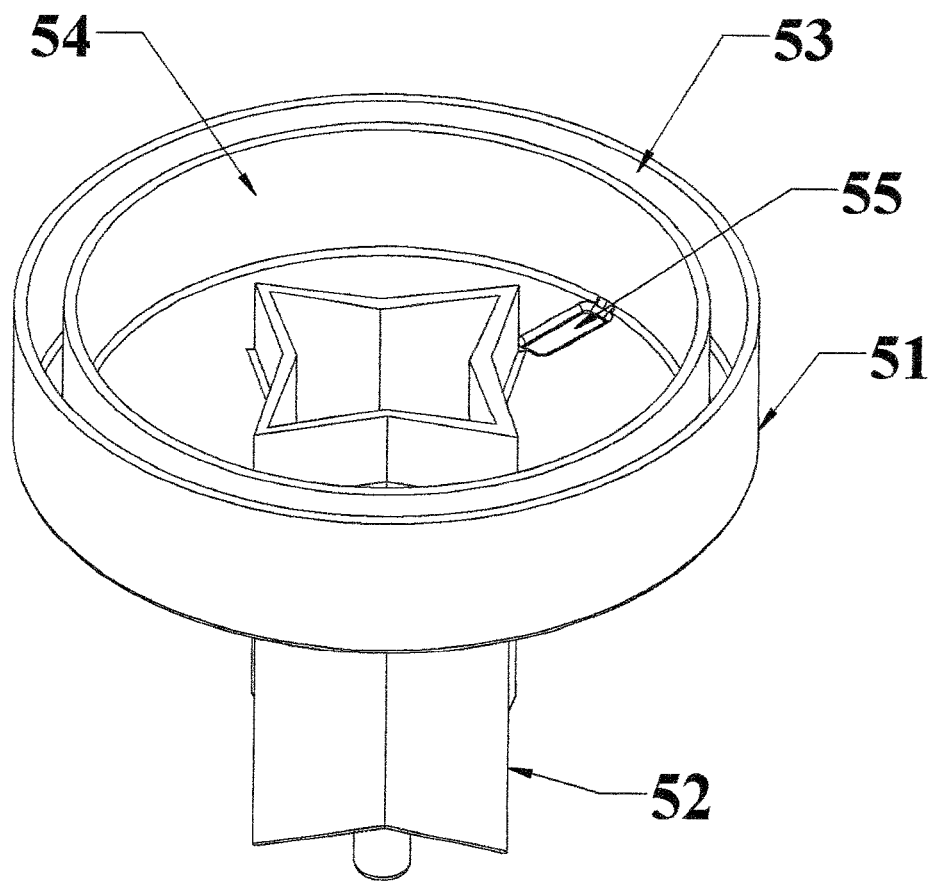
Figure 7:
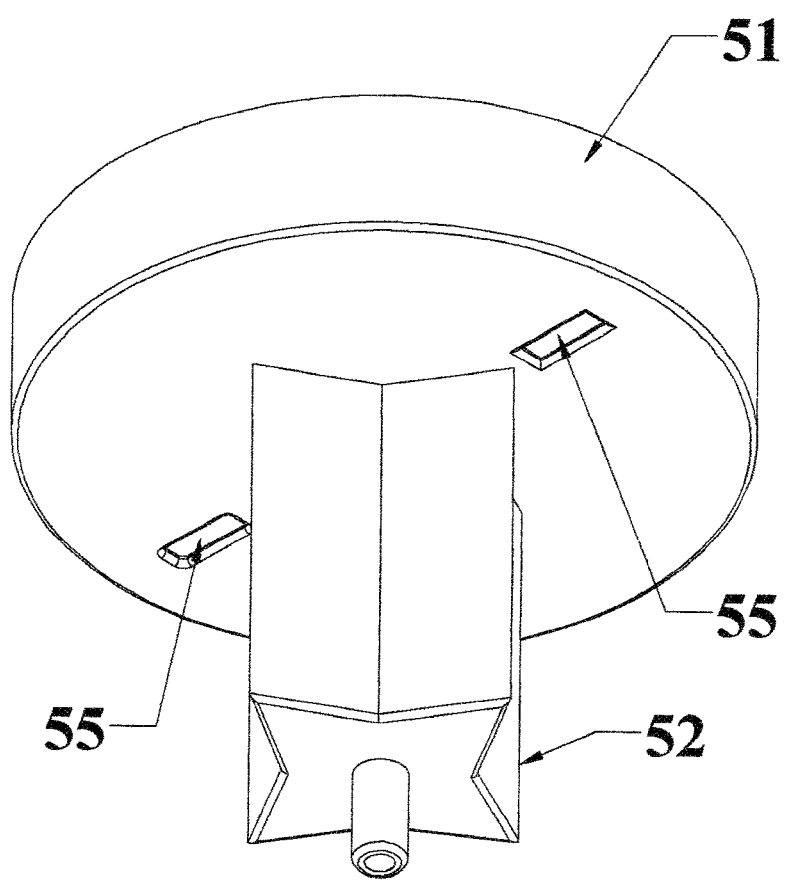
Figure 8:
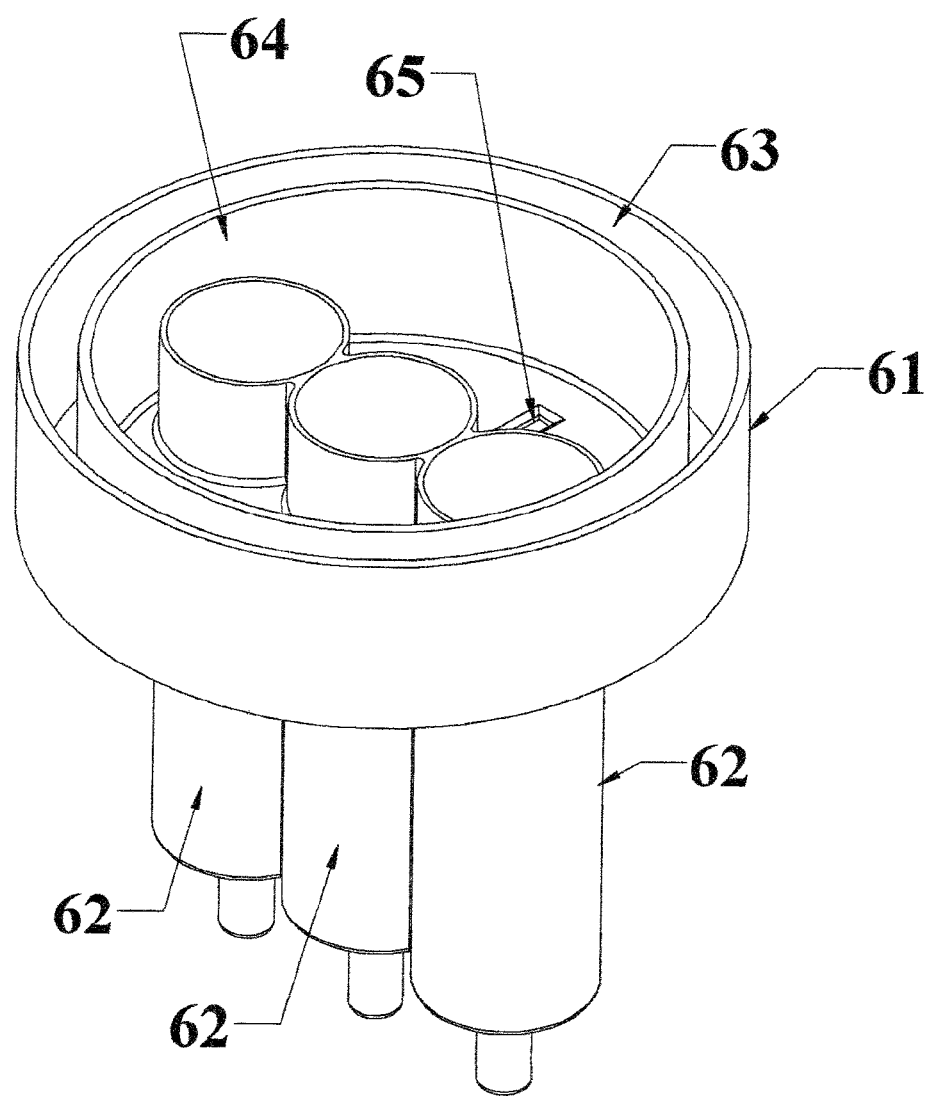
Figure 9:
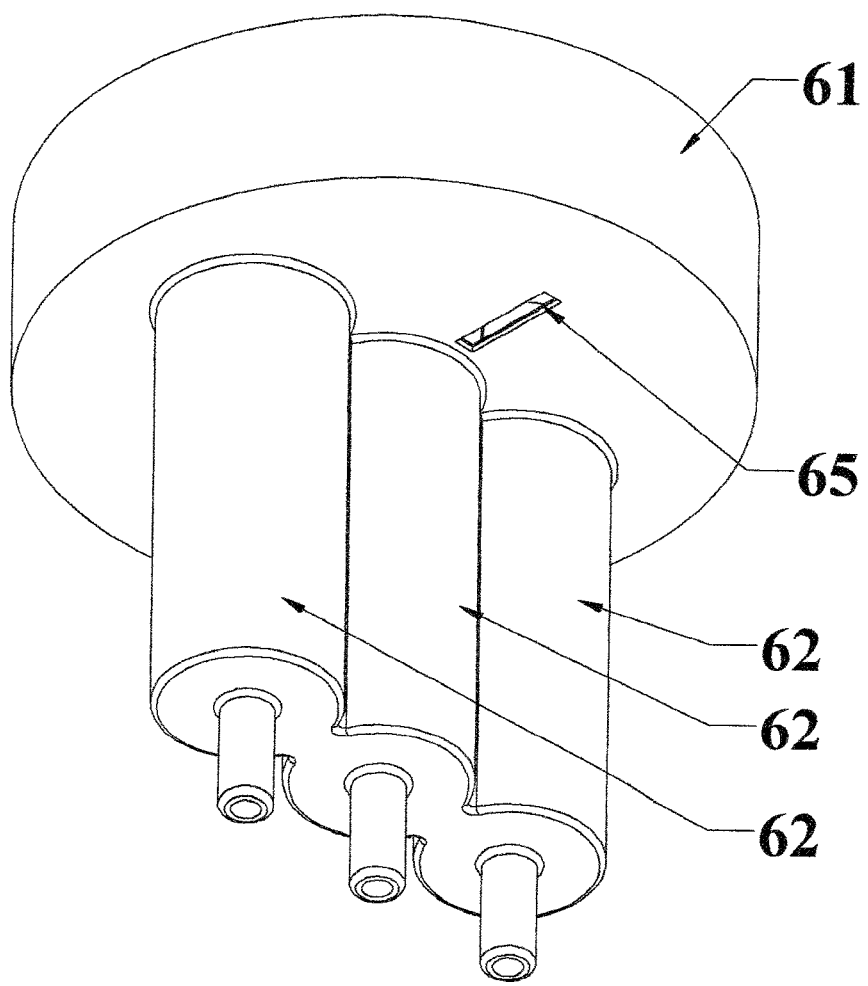
Figure 10:
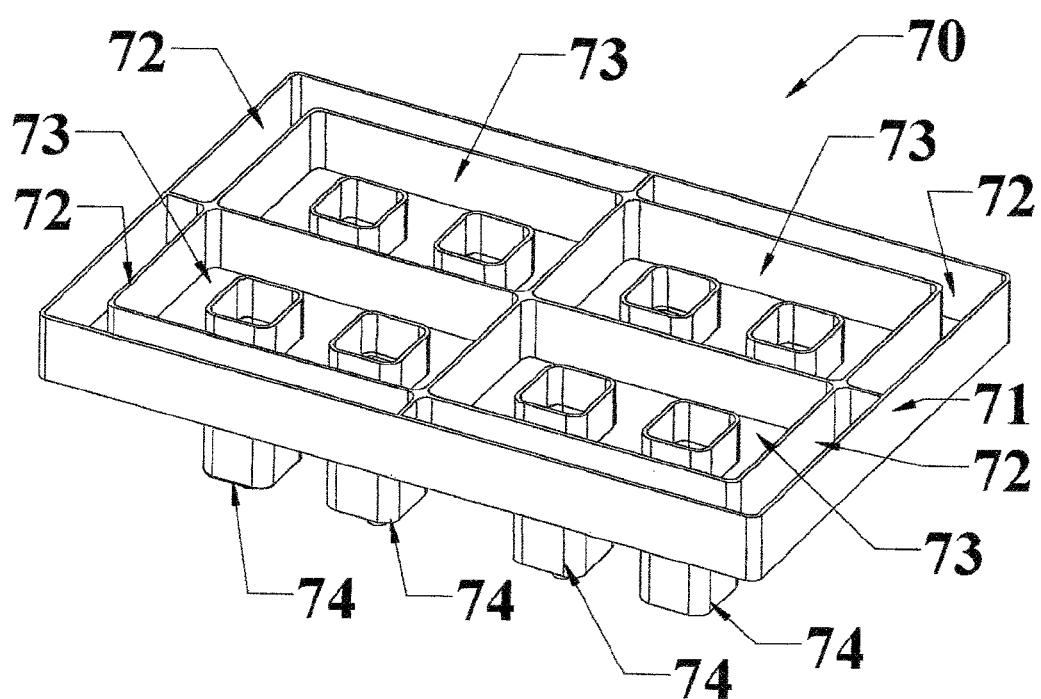
FIG. 10 is an isometric view of another variation of the top box, a component of a variation of the invented device. The hidden lines are not shown.

The vapor condensate rates depend on the areas of the contact surfaces. Based on this, several variations of the top box are also illustrated. FIG. 6 and FIG. 7 show the condensate chamber 52 of a variation of the top box has many surfaces. The top box will have the float/vapor chamber 51 which will have the float chamber 53, the vapor chamber 54 and the water supply slot 55, which will be similar as those described in the first variation of the invented devices. FIG. 8 and FIG. 9 show the variation with multiple condensate chambers 62. The float/vapor chamber 61 of this variation will have the float chamber 63, the vapor chamber 64 and the water supply slot 65, which are similar to those described previously. FIG. 10 shows the variation has different shape of the top box 70 which float/vapor chamber 71 will have float chamber 72, multiple vapor chambers 73 and multiple condensate chambers 74. (The multiple water supply slots are not shown.)

Figure 11:
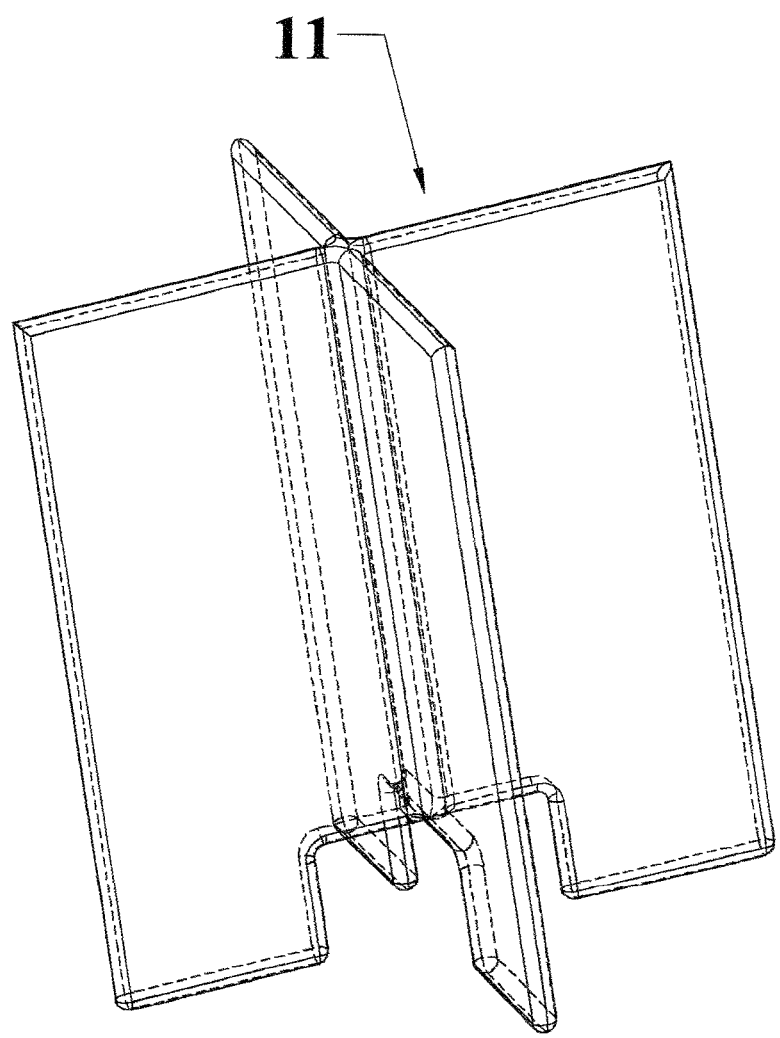
FIG. 11 is an isometric view of an optional insert for the top box shown in FIG. 3.
Figure 12:
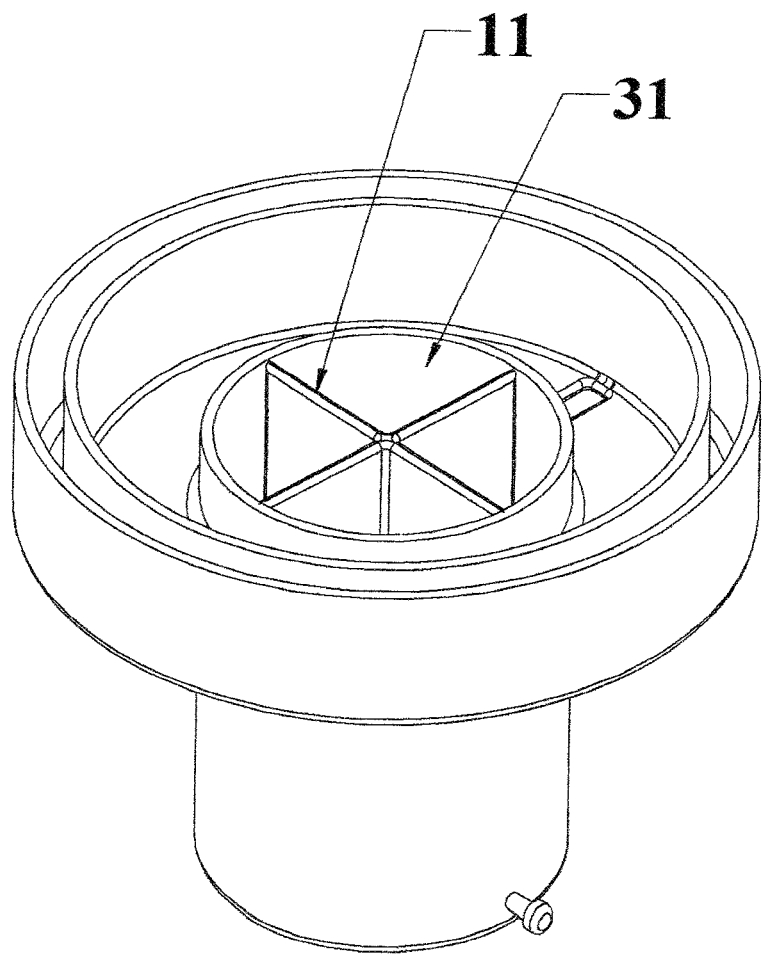
FIG. 12 is an isometric view which illustrates the use of the optional insert shown in FIG. 11 for the top box shown in FIG. 3.

The areas of the contact surfaces can be enlarged by inserts in the condensate chambers. FIG. 11 shows an example of the insert. FIG. 12 shows the insert 11 is in the condensate chamber 31 of the first variation of the invented top box.

Figure 13:
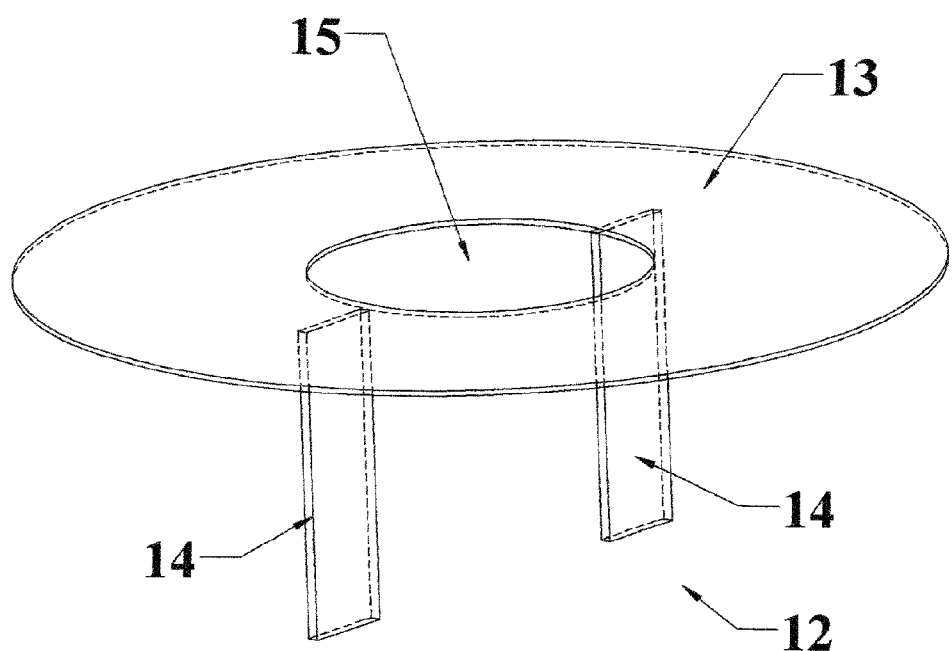
FIG. 13 is an isometric view of the optional water supplier for the top box shown in FIG. 3.
Figure 14:
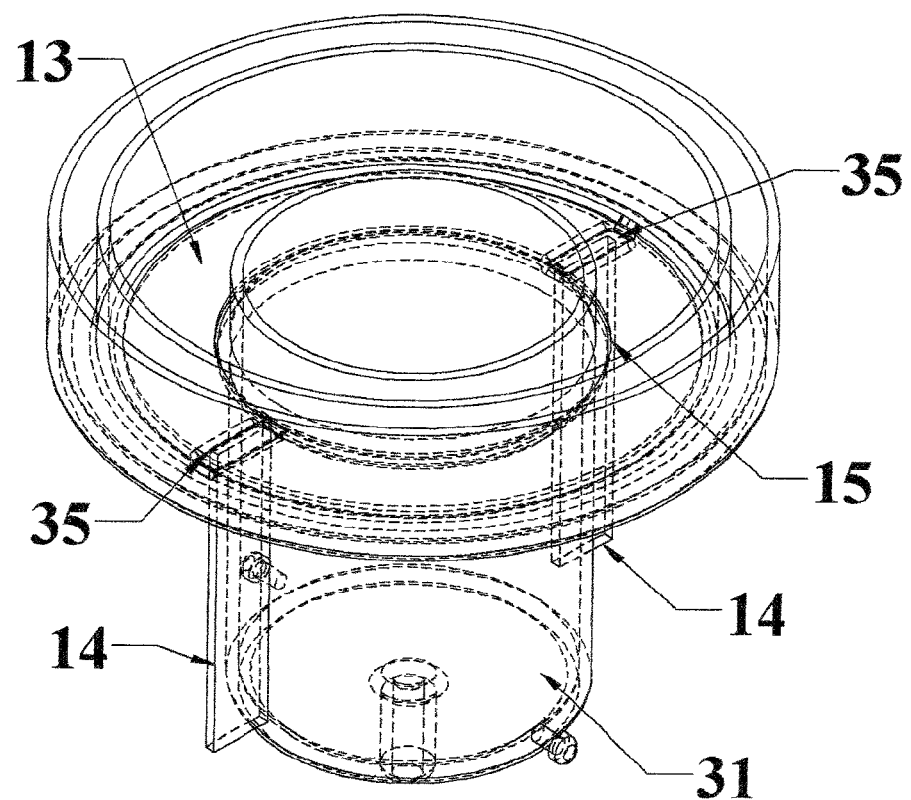
FIG. 14 is an isometric view which illustrates the use of the optional water supplier shown in FIG. 13 for the top box shown in FIG. 3.

One of the functions of the weight/shaker is to add weight to the top box so that the water can enter the float/vapor chamber. However, in order to ensure the water can enter the float/vapor chamber even if the condensate chamber provides unwanted extra floatation which causes the water supply slot of the float/vapor chamber to be above the water surface, a water supplier (referring to FIG. 13) can be used. The water supplier 12 has a water platform 13 on the top and at least one water raising leg 14 (two is shown) extruding from the water platform. There is an opening 15 on the water platform. The opening 15 can allow the rim of the condensate chamber to penetrate through. The water supplier is made of water affinity material such as a cotton cloth which allows passing of waters by capillary actions and forces. Referring to FIG. 14, the water platform 13 can be placed on the top of the floor (or bottom) of the vapor chamber with the water raising leg 14 is placed through the water supply slot 35.

When in use, the water raising leg of the water supplier will be dipped into the water. Water then will be raised by capillary force to spread on the water platform which will continuously supply water for generating water vapor, even if the water supply slot being above the water surface.

The floor of the vapor chamber may be in dark color to attract heat for water vapor generation. For the same reason, the water platform of the water supplier can be in dark color.

Referring to FIG. 15 through 20, one variation of the invented water vapor collectors 62 consists of a transparent dome 51, a top box 22, a dome water collector 52, an optional dome knocker 53, and an optional weight/shaker 23. The transparent dome is made of a transparent material which allows sun ray to penetrate through. There will be a dome knocker mount 54 on top of the dome 51 when the dome knocker 53 is used. The dome knocker mount has a dome knocker mount shaft 45 which is an extruding object from the dome. The dome knocker mount shaft has an enlarged end. The dome knocker 53 consists of a knocker hammer 56, a knocker mounting ring 59 and a knocker wind deflector 57. The knocker wind deflector 57 is thin plate which one end connects to the knocker mounting ring which is a ring which center hole has a diameter larger than this of the dome knocker mount shaft 45 but smaller than that of the enlarged end of the dome knocker mount shaft. The knocker wind deflector has a flip-up portion 63 which can deflect and change wind's direction when the wind blows across the knocker wind deflector. The knocker wind deflector has a knocker wind direction guide 58 which is a thin plate extruding upwards from the thin plate of the knocker wind deflector. Opposite to the knocker wind deflector connecting to the knocker mounting ring is the knocker hammer which is an elongated object with an enlarged end. The knocker will be mounted on the dome with the knocker mount shaft through the knocking mounting ring. Due to the difference in diameters and sizes of the knocker mount shaft, the enlarged end and the knocking mounting ring, the knocker will be able to move and turn on the knocker mount shaft. The dome water collector 52 basically is a relatively flat ring with a water collection channel 60 and a water outlet 61, both depressed areas near the center of the flat ring. The top box 22 and the weight/shaker 23 are the same as those described in the first variation of the invented devices (referring to FIG. 1 through FIG. 5).

Referring to FIG. 15 and FIG. 20, the dome water collector 52 will be mounted on top of the top box to create the float/vapor chamber, in the way just like those described for the first variation of the invented devices with the exception that the water outlet 61 will be directly over the top of the condensate chamber 31. The weight/shaker 23 and the tube 24 will be mounted to the top box the same way as described previously. The transparent dome 51 will be mounted on the dome water collector 52.

Referring to FIG. 15 and FIG. 20, the sun rays will evaporate some of the water 29 in the vapor chamber. The water vapors 27 will condensate on the transparent dome and on the interior surface of the condensate chamber. When the condensates reach to certain sizes, condensates will drop down eventually into the tube 24. The condensates on the transparent dome will firstly drop into the water collection channel 60 then flow into the condensate chamber through the water outlet 61 (referring to FIG. 19 also). When the dome knocker 53 is used, the wind 65 will push the knocker wind direction guide 58 (referring to FIG. 17) so that the knocker hammer 56 will point toward the wind direction. Meanwhile, the wind 65 will push downward the knocker wind deflector 57 by gusting through the flip up portion 63. Then the knocker hammer will be raise up from the exterior surface of the transparent dome. When the wind gust is over and the pushing force by the wind gust over the flip up portion 63 is gone, the knocker hammer will drop back to the surface of the transparent dome to create a knock. The knocks will be continued as long as the wind gusts exist. The knocks will help the condensates to drop down from the surfaces of the transparent dome and the condensate chamber. The water from the condensates may be conveyed away by means described previously.

The foregoing is considered as illustrative only of the principles of the invention. Furthermore, since numerous modifications and changes will readily occur to those skilled in the art, it is not desired to limit the invention to the exact construction and operation shown and described, and accordingly all suitable modifications and equivalents, may be resorted to, falling within the scope of the invention as claimed.

We claim:
1. A water vapor collector assembly comprising:
a) a transparent cover and a box;
b) said transparent cover being on top of said box;
c) said box having a condensation chamber, a vapor chamber, and a floatation chamber;
d) said vapor chamber having an opening on the bottom;
e) said condensation chamber having a rim extruding from the bottom of said vapor chamber;
f) there being a gap between said rim of said condensation chamber and the bottom of said transparent cover;
g) said floatation chamber connected to said vapor chamber;
h) the bottom of said condensation chamber having a short extruding tube which can connect with another tube;
i) said box being able to float on a water surface;
j) said condensation chamber having two extruding objects on its exterior surface for mounting a weight comprising at least an elongated object which can knock on the condensation chamber when there is a relative movement between said condensation chamber and said weight.

2. A water vapor collector assembly of claim 1 wherein said transparent cover comprises a dome-shaped object having an extruding object on which mounts a ring of a wind operated knocking device which comprises an elongate object, optionally ended with a hammer-liked object, and a thin plate with a flip up or curled portion on each side of said ring of said wind operated knocking device wherein said wind operated knocking device being able to knock on said dome-shaped object.

* * * * *